United States Patent Office 3,562,341
Patented Feb. 9, 1971

3,562,341
POLYFLUORINATED 1,3-DIENES HAVING FLUORINE SUBSTITUENTS IN THE 1,1,2-POSITION, THEIR POLYMERS, AND METHODS FOR MAKING THE SAME
Paul Tarrant and Marvin R. Lilyquist, Alachua County, Fla., and Alan M. Lovelace, Dayton, Ohio, assignors to the United States of America as represented by the Secretary of the Army
No Drawing. Continuation of application Ser. No. 504,698, Apr. 28, 1955. This application July 29, 1968, Ser. No. 753,831
Int. Cl. C07c 21/20, 17/34
U.S. Cl. 260—653.3                           7 Claims

ABSTRACT OF THE DISCLOSURE

This invention relates to incompletely polyfluorinated 1,3-dienes capable of forming cross-linked polymers and having fluorine substituents in at least the 1,1,2-position, and to synthesis for their preparation. More particularly, the invention relates to a synthesis for 1,1,2-trifluorobutadiene-1,3, and to the compounds 1,1,2,4,4-pentafluorobutadiene - 1,3, and 1,1,2,4,4 - pentafluoro-3-methylbutadiene-1,3.

---

This invention relates to polyfluorinated 1,3-diene monomers and polymers having fluorine substituents in the 1,1,2-position, and syntheses for their preparation.

This application is a continuation of our co-pending application Ser. No. 504,698, filed Apr. 28, 1955 (now abandoned).

A typical monomeric compound in accordance with the present invention is 1,1,2-trifluorobutadiene, $$CF_2:CF.CH:CH_2$$

which polymerizes to a cold-resistant and oil-resistant elastomer. Other polyfluorinated 1,3-dienes in accordance with the present invention may be represented by the general formula $$F_2C:CF.CY:CZ^1Z^2$$

wherein Y is hydrogen or methyl, and $Z^1$ and $Z^2$ are hydrogen, fluorine or trifluoromethyl; compounds falling under this general formula are, e.g., 1,1,2,4-tetrafluorobutadiene-1,3, 1,1,2,4,4-pentafluorobutadiene-1,3, 1,1,2,4,4-pentafluoro - 3 - methylbutadiene-1,3, and 1,1,2-trifluoro-4-trifluoromethylbutadiene-1,3. These latter compounds likewise polymerize readily due to the presence of two double bonds in the monomer molecule. It will be noted that all of the foregoing compounds differ from perfluorobutadiene-1,3 (a well known polymerizable fluorocarbon having the formula $CF_2:CF.CF:CF_2$) by the presence of one or more hydrogen atoms in the molecule, which has an important influence on their polymerization characteristics, and especially on their cross-linking patterns.

Reference is made in this connection to previously filed application Ser. No. 355,848, Paul Tarrant and Alan M. Lovelace, filed May 18, 1953, now Patent No. 2,750,431, dated June 12, 1956, and assigned to the same assignee as the present application, which discloses trifluorinated 1,3-butadienes wherein two of the fluorine atoms are located in the 1,1-position; e.g., 1,1,3-trifluorobutadiene-1,3. The present invention embodies an inventive improvement over the invention set forth in the said earlier application, in that it specifically provides for the placement of the third fluorine substituent in the 2-position of the carbon skeleton, or conversely, enables the production of fluorinated 1,3-diene monomers and polymers containing one or more hydrogen atoms in a predetermined position other than the 1,1,2-position.

Monomers in accordance with the present invention may be produced by one or both of the following two principal type reactions:

1.

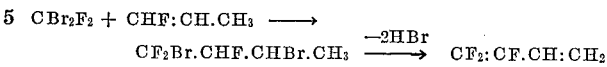

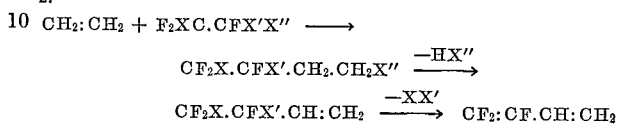

or

2.

$$CH_2:CH_2 + F_2XC.CFX'X'' \longrightarrow$$

$$CF_2X.CFX'.CH_2.CH_2X'' \xrightarrow{-HX''}$$

$$CF_2X.CFX'.CH:CH_2 \xrightarrow{-XX'} CF_2:CF.CH:CH_2$$

In the second type formula, X, X' and X'' are halogen atoms other than fluorine, i.e., bromine, chlorine, or iodine; or, otherwise stated, the reactant $F_2XC.CFX'X''$ is a 1,1,2-trifluoroethane having three additional halogen substituents other than fluorine; two preferred reactants which answer the foregoing description are 1,1,2-trifluoro-1,2-dibromo - 2 - chloroethane and 1,1,2-trifluoro-1,2-dichloro-2-iodoethane. Thus, the second type reaction, as specifically applied to the production of 1,1,2-trifluorobutadiene, proceeds as follows:

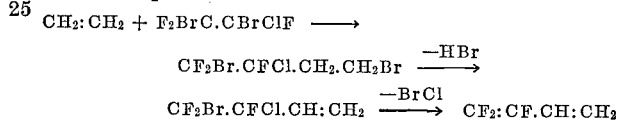

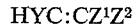

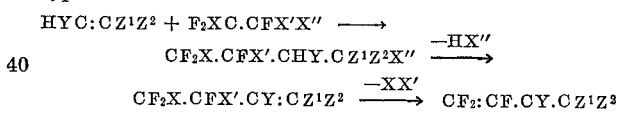

The second type reaction can be written more flexibly by substituting, in lieu of the term ethylene, the general formula $$HYC:CZ^1Z^2$$

wherein Y is hydrogen or methyl, and $Z^1$ and $Z^2$ are hydrogen, fluorine or trifluoromethyl. Thus, the second type reaction can be written:

$$HYC:CZ^1Z^2 + F_2XC.CFX'X'' \longrightarrow$$

$$CF_2X.CFX'.CHY.CZ^1Z^2X'' \xrightarrow{-HX''}$$

$$CF_2X.CFX'.CY:CZ^1Z^2 \xrightarrow{-XX'} CF_2:CF.CY:CZ^1Z^2$$

wherein X, X', X'', Y, $Z^1$ and $Z^2$ have the same meanings as above. Stated in somewhat more general terms, the just-described type reaction involves the formation of an adduct in the first stage, and in the second stage, the dehydrohalogenation of the adduct without removing its fluorine atoms.

The first of the above two principal type reactions employs as one of the starting materials a new compound, 1-fluoropropylene-1, $CHF:CH.CH_3$. This compound may be produced from 1-chloropropylene-1 by a series of steps which include reacting it with bromine to form a first intermediate compound 1,2-dibromo-1-chloropropane, fluorinating said first intermediate compound with hydrofluoric acid whereby a mixture of fluorinated halopropanes is formed, separating the second intermediate compound 1-chloro-1-fluoro-2-bromopropane from said mixture, and debromochlorinating said second intermediate compound to form 1-fluoropropylene-1. A specific example of this reaction will be given in a subsequent portion of the specification. The formation of the adduct from 1-fluoropropylene-1 and dibromodifluoromethane in accordance with said first type reaction preferably takes place in the presence of a catalyst such as benzoyl peroxide, and the dehydrobromination of the adduct 1,1,2-difluoro - 1,3 - dibromobutane ($CF_2Br.CHF.CHBr.CH_3$) may be carried out either in the presence of an inorganic alkaline substance such as potassium hydroxide or sodium hydroxide in alcohol solution, or, preferably, in the presence of a higher tertiary amine. We have found that the yield of the monomeric diene, 1,1,2-trifluorobutadiene, is very substantially increased by the employment of a high boiling (above 90° C.) tertiary amine, e.g., a tertiary amine having at least 12 carbon atoms such as tributyl amine or tri-i-amylamine in the final dehydrobromination step.

We have developed through further research a second principal type reaction for the production of 1,1,2-trifluorobutadiene and other 1,1,2-trifluorinated dienes, which does not necessitate the employment of 1-fluoropropylene-1 as a starting material. This second type reaction thus has the advantage that it avoids the necessity of first producing 1-fluoropropylene-1, which compound, insofar as we are aware, has not been known prior to our research and which therefore is not presently available in large quantities. A further advantage of the second principal type reaction is that it avoids the formation of relatively large quantities of by-products; a third important advantage is its flexibility in that it enables the formation of a number of incompletely fluorinated 1,3-dienes (i.e., of dienes having at least one hydrogen atom in a position other than the 1,1,2-position) by selecting appropriate olefins (such as ethylene or mono-, di- or trifluoroethylene) as one of the starting materials. The non-olefinic saturated compound which is employed as the second starting material in our second principal type reaction is a completely halogenated ethane which carries three, and only three, fluorine atoms in the 1,1,2-position; e.g., and preferably, 1,1,2-trifluoro-1,2-dibromo-2-chloroethane or 1,1,2 - trifluoro - 1,2 - dichloro-2-iodoethane. The adduct formed by reacting the olefinic and saturated starting materials is then converted into the desired 1,1,2-trifluorinated diene by a stepwise dehydrohalogenation without disturbing the position of the fluorine atoms of the adduct. The dehydrohalogenation may advantageously take place in the presence of alkaline reagents which do not cause the formation of by-products; suitable reagents are, for instance, the hydroxides of alkali metals, such as potassium hydroxide or sodium hydroxide in alcohol solution. The other step in the conversion of the adduct to the diene is a reaction with an acid-forming metal such as zinc or magnesium, or their salts, such as zinc chloride. While we prefer at present to carry out the dehydrohalogenation of the adduct by reacting it with the alkali first and with the zinc or magnesium last, we do not consider this sequence of steps to be critical inasmuch as that order can be reversed.

Having thus described several general aspects of our invention, we now proceed to illustrate the practice thereof by means of a number of specific examples; it will be understood, of course, that these examples are illustrative and are not intended to limit the scope of our invention.

(A) FORMATION OF 1,3-DIENES FROM 1-FLUOROPROPYLENE - 1 AND DIBROMODIFLUOROMETHANE

Example I.—Formation of 1-fluoropropylene-1 from 1-chloropropylene-1

In a 3-liter flask equipped with stirrer, addition funnel and reflux condenser was placed 923 g. (12.1 mols) of CHCl:CHCH$_3$. Bromine (320 cc.) was then added dropwise with stirring. After addition of all the bromine the mixture was allowed to stand overnight, it was then washed with a thiosulfate solution and dried over CaCl$_2$. Fractionation of the dried material yielded 432 g. of unreacted CHCl:CHCH$_3$, B.P. 33–36° C. and 1003 g. of CHClBrCHBrCH$_3$, B.P. 75°/25 mm.

741 g. (3.1 mols) of CHClBrCHBrCH$_3$ were placed in a liter autoclave cooled in Dry Ice and acetone and containing 6 one inch steel balls to facilitate mixing. 200 g. (10.1 mols) of HF, which had been previously trapped out, were poured in. 722 g. (3.1 mols) of HgO were mixed with an equal volume of calcium fluoride and were added a small volume at a time to the cooled mixture. After all the HgO had been added, the bomb was sealed and rocked at room temperature for 18 hours. The bomb was then opened. The contents were removed, neutralized with K$_2$CO$_3$ solution and steam distilled. The yield of crude product was 281 g. of material which was dried preparatory to fractionating. Fractionation of this material gave the following cuts:

| Cut: | Range, °C. | Flat, °C. | Weight, g. | Compound | Percent yield |
|---|---|---|---|---|---|
| I | 52.5–87.5 | 55.5 | 91 | CHClFCHFCH$_3$ | 25.7 |
| II | 87.5–109 | 93–94 | 29 | CHF$_2$CHBrCH$_3$ | 5.7 |
| III | 109–114 | 113 | 71 | CHFClCHBrCH$_3$ | 13.1 |
| Residue | | | 73 | CHClBrCHBrCH$_3$ | 9.9 |

Cut III, CHFClCHBrCH$_3$ was converted to 1-fluoropropylene-1 as follows: 195 g. (3 mols) of zinc, 3 g. of zinc chloride and 250 cc. of n-propanol were placed in a liter flask equipped with stirrer, addition funnel and reflux condenser to which was attached a trap immersed in Dry Ice and acetone. This refluxing mixture was heated, and 423 g. (2.4 mols) of CHFClCHBrCH$_3$ were added dropwise; the conversion product, crude CHF:CHCH$_3$ was collected in the trap. This material was dried and fractionated through a 60 cm. vacuum jacketed silvered column. The yield obtained was 88 g. (60% conversion) of gaseous CHF:CH.CH$_3$, B.P. −19° C., mol. wt. 60.1 (calculated), 60.5 (found).

Example IIa.—Adduct of 1-fluoropropylene-1 and dibromodifluoromethane

The following materials were loaded in a liter autoclave.

CF$_2$Br$_2$: 1250 g. (5.9 mols)
CHF:CHCH$_3$: 88 g. (1.46 mols)
Benzoyl peroxide: 15 g.

The autoclave was rocked and heated at 100° C. for 4 hours. The excess CF$_2$Br$_2$ (777 g.) was then bled off and the remaining high boiling material (448 g.) was fractionated. One fraction (208 g.) was obtained with the following constants, B.P. 56°/43 mm., $n_D^{23}$ 1.4411, $d_4^{25}$ 1.9438. The MR$_D$ calculated for C$_4$H$_5$F$_3$Br$_2$ was 36.20, observed 36.43. The yield of 208 g. corresponds to a 55% yield. This material has the structure

CF$_2$Br.CHF.CHBr.CH$_3$

Example IIb.—Dehydrobromination of 1,1,2-trifluoro-1,3-dibromobutane 296 g. of tributylamine were heated to 148° C. from a flask equipped with stirrer, addition funnel, and refluxing condenser connected to cold traps. 194 g. of

CF$_2$BrCHFCHBrCH$_3$ were slowly added to the hot amine. The reaction was discontinued after 5 hours. The material collected in the cold trap was fractionated and gave 47 g. of 1,1,2-trifluorobutadiene (CF$_2$:CF.CH:CH$_3$), which is a gas at room temperature, having a boiling point of 7.9° C.; mol. wt. 108.1. This monomeric compound polymerizes on standing to a vulcanizable elastomeric solid having great resistance to swelling when exposed to solvents, petroleum oil, hydrocarbon fuels, but shows no substantial stiffening when exposed to subzero (<0° F.) temperatures. A 50:50 mixture of monomeric 1,1,2-trifluorobutadiene-1,3 and 1,1,3-trifluorobutadiene-1,3 likewise polymerized to a vulcanizable cold-resistant elastomer.

(B) FORMATION OF 1,1,2-FLUORINATED-1,3-DIENES FROM 1,1,2-TRIFLUORO-1,2-DIBROMO-2-CHLOROETHANE AND OLEFINS

Example IIIa.—Adduct of 1,1,2-trifluoro-1,2-dibromo-2-chloroethane and ethylene A 1.4 liter autoclave was charged with 1125 g. (4.0 mols) of 1,2-dibromo-2-chloro-1,1,2-trifluoroethane, 52 g. (1.9 mols) of ethylene and 15 g. (0.06 mol) of benzoyl peroxide. It was sealed, heated and rocked four hours at 100°. After the vessel was cooled in ice water, the excess ethylene was vented and the liquid reaction product was distilled. There was obtained 319 g. (58% conversion) of the one-to-one adduct, $CF_2Br.CFCl.CH_2CH_2Br$, for which the following constants were obtained: B.P. 67.4°/20 mm., $n_D^{25}$ 1.4563, $d_4^{25}$ 2.035, $MR_D$ calculated for $C_4H_4Br_2ClF_3$: 41.08, found: 40.67. Analysis: silver equivalent calculated for $C_4H_4Br_2ClF_3$: 101.5, found: 101.9.

Example IIIb.—Formation of 1,1,2-trifluorobutadiene-1,3 by dehydrohalogenation of 1,1,2-trifluoro-1,4-dibromo-2-chlorobutane A saturated solution of potassium hydroxide, 3 mols, in propanol-1, 1000 ml., was added dropwise to 305 g. (1 mol) of hot $CF_2BrCFClCH_2CH_2Br$ contained in a two liter flask equipped with a stirrer, addition funnel and distilling head. A mixture of the olefin and propanol was distilled off as the reaction proceeded. This material was washed well with water and dried. Fractional distillation of the dried product gave 150 g. of the olefin,

$CH_2:CH.CFCl.CF_2Br$, for a 68% conversion. The following constants were obtained for this compound: B.P. 99.5°, $n_D^{25}$ 1.4092, $d_4^{25}$ 1.678, $MR_D$ calculated for $C_4H_3BrClF_3$: 32.84, found: 32.93. Analysis: silver equivalent calculated for

$C_4H_3BrClF_3$ 111.7, found: 113.4

The above olefin, 224 g. (1 mol) was added dropwise to a refluxing mixture of 2 mols of zinc dust, 1. g. of zinc chloride and 200 ml. of propanol-2. The product, 1,1,2-trifluorobutadiene-1,3, was collected as it was formed in a trap immersed in Dry Ice and acetone. Distillation of the 110 g. of crude product gave a fraction of 95 g., 88% conversion of pure 1,1,2-trifluorobutadiene-1,3; B.P. 7.9° C.; mol. wt. 108.1.

Example IVa.—Adduct of 1,1,2-trifluoro-1,2-dibromo-2-chloroethane and fluoroethylene In the manner described above in Example IIIa, 1125 g. (4 mols) of 1,2-dibromo-2-chloro-1,1,2-trifluoroethane, 60 g. (1.3 mols) of fluoroethylene and 10 g. (0.04 mol) of benzoyl peroxide were charged into the reaction vessel. The vessel was sealed, heated and rocked four hours at 100°. It was then cooled, opened and the unreacted 1,2-dibromo-2-chloro-1,1,2-trifluoroethane was removed by distillation. The high boiling liquid remaining was fractionated under vacuum giving two fractions.

The lower boiling fraction, 311 g., contained the one-to-one adduct, $CF_2BrCFClCH_2CHFBr$, with the following constants: B.P. 72°/32 mm., $n_D^{25}$ 1.4403, $d_4^{25}$ 2.075, $MR_D$ calculated for $C_4H_3Br_2ClF_4$: 41.08, found: 41.00. Analysis: silver equivalent calculated for $C_4H_3Br_2ClF_4$: 107.4, found: 106.5. The conversion to the one-to-one adduct was 74% based on the fluoroethylene.

Example IVb.—Formation of 1,1,2,4-tetrafluorobutadiene-1,3-by dehydrohalogenation of 1,1,2,4-tetrafluoro-1,4-dibromo-2-chlorobutane To a hot aqueous solution of 150 g. of potassium hydroxide in 100 ml. of water was added dropwise one mol (323 g.) of $CF_2BrCFClCH_2CHFBr$. The product was distilled from the reaction flask as it formed, washed with water and dried. Fractional distillation gave 65 g. of the olefin $CF_2Br.CFCl.CH:CHF$ and 38.5 g. of the unreacted halo-butane for a yield of 48%. The olefin had the following constants: B.P. 97–97.3°, $n_D^{25}$ 1.3961, $d_4^{25}$ 1.781, $MR_D$ calculated: 32.44, found 32.58. Analysis: silver equivalent calculated for $C_4H_2BrClF_4$: 120.7, found: 121.3.

Treatment of the above olefin (160 g., 0.66 mol) with a slurry of 75 g. of zinc dust in 80 ml. of propanol-1 contained in a 200 ml., three neck flask equipped with a stirrer, addition funnel and distilling head resulted in 74 g. of crude product. This was fractionally distilled to give 67 g. of 1,1,2,4-tetrafluorobutadiene-1,3, for a conversion of 80%; this material had the following constants: B.P. 16.5°, $n_D^0$ 1.3427, $d_4^0$ 1.342, $MR_D$ calculated for $C_4H_2F_4$: 19.74, found: 19.84; molecular weight 126.1.

Example Va.—Adduct of 1,1,2-trifluoro-1,2-dibromo-2-chloroethane and 1,1-difluoroethylene Example IIIa was repeated, except that 122 g. (1.9 mols) of 1,1-difluoroethylene were employed as one of the starting materials in lieu of ethylene. The liquid reaction product was subjected to fractional distillation, and 282 g. (44% conversion) of the one-to-one adduct $CF_2Br.CFCl.CH_2.CF_2Br$ were obtained; the following constants were established: B.P. 70.1°/50 mm., $n_D^{27}$ 1.4230, $d_4^{27}$ 2.063, $MR_D$ calculated for $CF_2BrCFClCH_2CF_2Br$: 41.08, found: 41.03. Analysis: silver equivalent calculated for $C_4H_2Br_2ClF_5$: 113.4, found: 111.9.

123 g. (23.4% conversion) of the two-to-one adduct $CF_2Br.CFCl.CH_2CF_2CH_2.CF_2Br$, were also obtained, with the following constants: B.P. 90–91°/20 mm., $n_D^{27}$ 1,4112, $d_4^{27}$ 2.014, $MR_D$ calculated for $C_6H_4Br_2ClF_7$: 49.61, found: 50.30. Analysis: silver equivalent calculated for $C_6H_4Br_2ClF_7$: 134.7, found: 133.6.

Example Vb.—Formation of 1,1,2,4,4 - pentafluorobutadiene-1,3 by dehydrohalogenation of 1,1,2,4-pentafluoro-1,4-dibromo-2-chlorobutane 170 g. (0.5 mol) of the one-to-one adduct $CF_2Br.CFCl.CH_2.CF_2Br$ obtained in accordance with Example Va were added dropwise to a hot solution of potassium hydroxide, 100 g., in 75 ml. of water. The crude product was distilled from the reaction flask as it formed, washed with water and dried. Fractional distillation of the 111 g. of material thus obtained gave 63 g. (48.8% conversion) to the 1-bromo-2-chloro-1,1,2,4,4-pentafluorobutene-3 with the following constants: B.P. 91.0°, $n_D^{24}$ 1.3837, $d_4^{24}$ 1.838, $MR_D$ calculated for $C_4HBrClF_5$: 32.84, found: 32.97. Analysis: silver equivalent calculated for $C_4HBrClF_5$: 129.7, found: 130.2.

58 g. (0.22 mol) of this olefin were dropped onto a refluxing slurry of 65 g. zinc dust and 1 g. of anhydrous zinc chloride in 75 ml. of propanol-2. The diene distilled from the reaction flask as it formed and was collected in a Dry Ice cooled trap attached to the reflux condenser. Fractionation of the crude material gave 26 g., 80% conversion, pure 1,1,2,4,4 - pentafluorobutadiene - 1,3 ($CF_2:CF.CH:CF_2$, 2H-pentafluorobutadiene), B.P. 15.5°. Analysis: molecular weight calculated for $C_4HF_5$: 144.1, found: 145.2.

(C) FORMATION OF 1,1,2-FLUORINATED 1,3-DIENES FROM 1,1,2-TRIFLUORO-1,2-DICHLORO-2-INDOETHANE AND OLEFINS

Example VIa.—Adduct of 1,1,2 - trifluoro-1,2 - dichloro-2-iodoethane and 1,1-difluoropropylene-1

The autoclave of Example IIIa was charged with 323 g. (1.12 mols) of 1,1,2-trifluoro-1,2-dichloro-2-iodoethane, 17 g. (0.22 mol) of 1,1-difluoropropylene-1 and 5 g. (0.02 mol) of benzoyl peroxide, heated and rocked four hours at 100°. Fractional distillation of the reaction product gave 238 g. of unreacted CF₂ClCFClI and 70 g. of the one-to-one adduct,

The conversion to the adduct was 89% based on 1,1-difluoropropylene-1. The following constants were obtained for this adduct: B.P. 75.0°/20 mm., $n_D^{25}$ 1.4567, $d_4^{25}$ 1.994, $MR_D$ calculated for $C_5H_4Cl_2F_5I$: 47.82, found: 48.72. Analysis: silver equivalent calculated for $C_5H_4Cl_2F_5I$: 118.97, found: 119.2.

Example VIb.—Formation of 1,1,2,4,4-pentafluoro-3-methylbutadiene-1,3 by dehydrohalogenation of 1,1,-2,4,4-pentafluoro-1,2-dichloro-3-methyl-4-iodobutane The one-to-one adduct of Example VIa,

was refluxed with a hot solution of 70 g. potassium hydroxide in 50 ml. of water for a period of 3 hours. The crude olefin was distilled as it formed, washed with a solution of sodium thiosulfate to remove traces of iodine and dried. Fractional distillation gave 52 g., 57% conversion, of 1,1,2,4,4-pentafluoro - 1,2 - dichloro - 3-methylbutene-3. The following constants were determined for this compound: B.P. 100.5°, $n_D^{22}$ 1.3746, $d_4^{22}$ 1.515, $MR_D$ calculated for $C_5H_3Cl_2F_5$: 34.56, found: 34.64. Analysis: percent chlorine calculated for $C_5H_3Cl_2F_5$: 31.3, found: 31.4.

The above olefin, 41 g. (0.18 mol) was refluxed with a mixture of 33 g. of zinc dust, 1 g. of anhydrous zinc chloride and 50 ml. of propanol-1. The product was washed, dried and fractionally distilled to give 21 g. of 1,1,2,4,4-pentafluoro-3-methylbutadiene-1,3

conversion 74%. The constants obtained for this compound are as follows: B.P. 37.0°, $n_D^{20}$ 1.3250, $d_4^{20}$ 1.289, $MR_D$ calculated for $C_5H_3F_5$: 24.36, found: 24.68. Analysis: percent carbon calculated for $C_5H_3F_5$: 37.92, found: 38.12 percent hydrogen calculated; 1.91, found: 1.90; mol. wt. 158.

Example VIIa.—Adduct of 1,1,2-trifluoro-1,2-dichloro-2-iodoethane and 1,1,1-trifluoropropylene-2

The autoclave of Example IIIa was charged with 406 g. (1.45 mols) of 1,1,2-trifluoro-1,2-dichloro-2-iodoethane, 40 g. (0.417 mol) of 1,1,1-trifluoropropylene-2 and 5 g. (0.02 mol) of benzoyl peroxide, heated and rocked four hours at 100°. The crude reaction product, 444 g., was fractionally distilled to give 261 g. of recovered CF₂ClCFClI and 150 g. of the one-to-one addition product

representing a 95% conversion to the adduct based on the trifluoropropylene. The constants for this compound are as follows: B.P. 61°/18 mm., $n_D^{22}$ 1.4275, $d_4^{22}$ 2.013, $MR_D$ calculated for $C_5H_3Cl_2F_6I$: 27.82, found: 47.91. Analysis: silver equivalent calculated for $C_5H_3Cl_2F_6I$: 125.0, found: 125.9.

Example VIIb.—Formation of 1,1,2-trifluoro-4-trifluoromethylbutadiene-1,3 by dehydrohalogenation of 1,1,2-trifluoro-1,2-dichloro-4-iodo-4-trifluoromethylbutane 96 g. (0.2 mol) of the one-to-one adduct

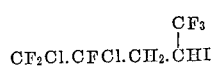

were refluxed with 60 ml. of a heated aqueous solution containing 100 g. of potassium hydroxide in 50 ml. of water for a period of 3 hours. Fractionation of the crude liquid reaction product gave 40 g. (63%) conversion of

with the following constants: B.P. 87.5°, $n_D^{23}$ 1.3472, $d_4^{23}$ 1.519, $MR_D$ calculated for $C_5H_2Cl_2F_6$: 34.56, found: 34.78. Analysis: percent chlorine calculated for $C_5H_2Cl_2F_6$: 28.75, found: 29.0.

39.5 g. (0.16 mol) of this olefin was refluxed with zinc dust 30 g., anhydrous zinc chloride 0.5 g., and propanol-1, 50 ml. There were obtained 20 g. (72% conversion) of 1,1,2-trifluoro - 4 - trifluoromethylbutadiene-1,3

1,1,2,5,5,5-hexafluoropentadiene-1,3); with the following constants: B.P. 50.5°, $n_D^{22}$ 1.3322, $d_4^{22}$ 1.389, $MR_D$ calculated for $C_5H_2F_6$: 24.36, found: 26.01. Analysis: percent carbon calculated for $C_5H_2F_6$: 34.11, found: 33.90, percent hydrogen calculated: 1.15, found: 1.26; mol. wt. 178.

From the foregoing description of our invention, it will be apparent to those skilled in the art that a variety of polyfluorinated 1,3-dienes having fluorine substituents in the 1,1,2-position may be formed in accordance with our invention, and furthermore that the practice of our invention makes it possible to select the position of one or more hydrogen atoms on the carbon skeleton of such dienes in any desired location other than the 1,1,2-position. Polymers and copolymers formed from the new polyfluorinated dienes herein disclosed have valuable industrial properties, particularly as to cold- and oil-resistance. We do not wish to be understood to limit the scope of our invention to the examples specifically herein set forth, inasmuch as modifications and adaptations within the spirit of our invention will readily occur to those skilled in the art. We thus intend to claim our invention broadly and to define its scope by the appended claims.

We claim:
1. Process of synthesizing 1,1,2-trifluorobutadiene-1,3, comprising the steps of:
    (a) adding one molecule of fluorine bromide to 1-chloropropylene-1 to form 1-chloro-1-fluoro-2-bromopropane;
    (b) removing one molecule of bromine chloride from said 1-chloro-1-fluoro-2-bromopropane to form 1-fluoropropylene-1;
    (c) coupling said 1-fluoropropylene-1 with dibromodifluoromethane to form the adduct 1,1,2-trifluoro-1,3-dibromobutane; and
    (d) removing two molecules of hydrogen bromide from said 1,1,2-trifluoro-1,3-dibromobutane to form 1,1,2-trifluorobutadiene-1,3.
2. Process of synthesizing 1,1,2-trifluorobutadiene-1,3, comprising the steps of:
    (a) reacting 1-chloropropylene-1 with bromine and hydrofluoric acid to form 1-chloro-1-fluoro-2-bromopropane;
    (b) reacting said 1-chloro-1-fluoro-2-bromopropane with zinc to form 1-fluoropropylene-1;
    (c) coupling said 1-fluoropropylene-1 with dibromodifluoromethane to form the adduct 1,1,2-trifluoro-1,3-dibromobutane; and
    (d) removing two molecules of hydrogen bromide from said 1,1,2-trifluoro-1,3-dibromobutane to form 1,1,2-trifluorobutadiene-1,3.

3. Process according to claim 2, wherein the removal of hydrogen bromide from said 1,1,2-trifluoro-1,3-dibromobutane is carried out in the presence of a tertiary amine.

4. Process according to claim 3, wherein said tertiary amine is tributylamine.

5. A member selected from the group consisting of 1,1,2,4,4-pentafluorobutadiene-1,3 and 1,1,2,4,4 - pentafluoro-3-methyl butadiene-1,3.

6. 1,1,2,4,4-pentafluorobutadiene-1,3.

7. 1,1,2,4,4-pentafluoro-3-methyl butadiene-1,3.

References Cited

UNITED STATES PATENTS

| | | | |
|---|---|---|---|
| 3,308,175 | 3/1967 | Barr | 260—653.5 |
| 2,686,207 | 8/1954 | Crane | 260—653.5 |
| 2,668,182 | 2/1954 | Miller | 260—653.3 |
| 2,965,619 | 12/1960 | Honn et al. | 260—87.5 |

DANIEL D. HORWITZ, Primary Examiner

U.S. Cl. X.R.

260—653.5, 82.7, 92.1